United States Patent
Kurematsu

(10) Patent No.: US 10,260,603 B2
(45) Date of Patent: Apr. 16, 2019

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 385 days.

(21) Appl. No.: 15/348,046

(22) Filed: Nov. 10, 2016

(65) Prior Publication Data

US 2017/0130807 A1    May 11, 2017

(30) Foreign Application Priority Data

Nov. 10, 2015 (JP) .................. 2015-220383

(51) Int. Cl.
    *F16H 7/08* (2006.01)

(52) U.S. Cl.
    CPC ... *F16H 7/0848* (2013.01); *F16H 2007/0806* (2013.01); *F16H 2007/0814* (2013.01); *F16H 2007/0859* (2013.01); *F16H 2007/0872* (2013.01); *F16H 2007/0893* (2013.01)

(58) Field of Classification Search
    CPC ..... F16H 2007/0806; F16H 2007/0859; F16H 2007/0812; F16H 2007/0814; F16H 7/0848
    USPC ........................................ 474/110
    See application file for complete search history.

(56) References Cited

U.S. PATENT DOCUMENTS

| | | | | |
|---|---|---|---|---|
| 5,637,047 A * | 6/1997 | Schulze | ................ | F16H 7/0848 474/110 |
| 5,700,213 A * | 12/1997 | Simpson | ............... | F16H 7/0848 474/110 |
| 5,707,309 A * | 1/1998 | Simpson | ................... | F16H 7/08 474/110 |
| 5,879,256 A * | 3/1999 | Tada | ........................ | F16H 7/08 474/110 |
| 5,935,031 A * | 8/1999 | Tada | ..................... | F15B 21/044 474/101 |

(Continued)

FOREIGN PATENT DOCUMENTS

| JP | 2002-130401 A | 5/2002 |
|---|---|---|
| JP | 2002-235818 A | 8/2002 |

(Continued)

*Primary Examiner* — Henry Y Liu
(74) *Attorney, Agent, or Firm* — Westerman, Hattori, Daniels & Adrian, LLP

(57) ABSTRACT

To provide a chain tensioner that can maintain the pressure of the oil pressure chamber at a correct level to achieve a desired reaction force and damping characteristics corresponding to the rpm, and enable a reduction in the number of parts to be machined and the number of assembling steps; reduce the amount of oil flowing out of the system; and prevent damage to the check valve, without causing an increase in size of the chain tensioner. The chain tensioner includes a check valve unit 150 that stops reverse flow of oil flowing into an oil pressure chamber 101, and a first relief valve unit 160 and a second relief valve unit 170 that release oil when the pressure reaches or exceeds a predetermined high level. The second relief valve unit 170 has a higher valve opening pressure than that of the first relief valve unit 160.

5 Claims, 5 Drawing Sheets

(56) References Cited

U.S. PATENT DOCUMENTS

| | | | | |
|---|---|---|---|---|
| 6,193,623 B1* | 2/2001 | Koch | F16H 7/0836 | 474/110 |
| 6,322,468 B1* | 11/2001 | Wing | F16H 7/08 | 474/109 |
| 6,352,487 B1* | 3/2002 | Tada | F01L 1/02 | 474/110 |
| 6,361,458 B1* | 3/2002 | Smith | F16H 7/0848 | 474/109 |
| 6,383,103 B1* | 5/2002 | Fujimoto | F01L 1/02 | 474/109 |
| 6,398,682 B1* | 6/2002 | Suzuki | F16H 7/08 | 474/110 |
| 6,435,993 B1* | 8/2002 | Tada | F16H 7/0836 | 474/109 |
| 6,592,479 B2* | 7/2003 | Nakakubo | F16H 7/0848 | 474/109 |
| 6,810,907 B2* | 11/2004 | Hashimoto | F16H 7/0848 | 137/514.5 |
| 7,070,528 B2* | 7/2006 | Emizu | F16H 7/0836 | 474/109 |
| 7,174,799 B2* | 2/2007 | Yoshida | F16H 7/0836 | 474/101 |
| 7,618,339 B2* | 11/2009 | Hashimoto | F01L 1/02 | 474/109 |
| 7,699,730 B2* | 4/2010 | Emizu | F16H 7/0836 | 474/110 |
| 7,775,923 B2* | 8/2010 | Sato | F16H 7/0836 | 474/109 |
| 7,775,924 B2* | 8/2010 | Koch | F16H 7/0848 | 251/337 |
| 8,002,656 B2* | 8/2011 | Emizu | F16H 7/0836 | 474/109 |
| 8,137,224 B2* | 3/2012 | Emizu | F16H 7/0836 | 474/110 |
| 8,221,274 B2* | 7/2012 | Sato | F16H 7/0836 | 474/109 |
| 8,574,106 B2* | 11/2013 | Botez | F16H 7/0848 | 474/110 |
| 8,574,107 B2* | 11/2013 | Nakano | F16H 7/0836 | 474/110 |
| 8,585,519 B2* | 11/2013 | Hartmann | F16H 7/0836 | 474/110 |
| 8,951,154 B2* | 2/2015 | Konunna | F16H 7/0848 | 474/110 |
| 2002/0052259 A1* | 5/2002 | Nakakubo | F16H 7/0848 | 474/109 |
| 2002/0169042 A1* | 11/2002 | Kurohata | F16H 7/0848 | 474/110 |
| 2006/0089221 A1* | 4/2006 | Hashimoto | F01L 1/02 | 474/110 |
| 2011/0256970 A1* | 10/2011 | Nakano | F16H 7/0836 | 474/110 |

FOREIGN PATENT DOCUMENTS

| | | |
|---|---|---|
| JP | 2002-327810 A | 11/2002 |
| JP | 2006-125430 A | 5/2006 |
| JP | 2011-226534 A | 11/2011 |
| WO | 2015/115555 A1 | 8/2015 |

* cited by examiner

CHAIN TENSIONER

BACKGROUND OF THE INVENTION

1. Field of the Invention

The present invention relates to a chain tensioner that includes a tensioner body having a cylindrical plunger bore with one open end, a cylindrical plunger slidably inserted in the plunger bore, and biasing means accommodated inside an oil pressure chamber formed between the plunger bore and the plunger such as to freely expand and contract and to urge the plunger in a projecting direction, and that maintains appropriate tension of a chain.

2. Description of the Related Art

It has been common practice to use a chain tensioner for maintaining appropriate tension of a chain. For example, a chain guide mechanism has been known, which slidably guides, by means of a guide shoe, a transmission chain such as an endless roller chain passing over respective sprockets of a crankshaft and a cam shaft inside an engine room, and which uses a chain tensioner to press a pivoting chain guide having the guide shoe to maintain appropriate tension.

A chain guide mechanism is configured as shown in FIG. 4, for example, wherein a pivoting chain guide G1 and a fixed chain guide G2 guide an endless timing chain CH passing over a drive sprocket S1 of a crankshaft and a pair of driven sprockets S2 and S3 of cam shafts inside an engine room.

The fixed chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

A chain tensioner 500 presses the pivoting chain guide G1 and thereby maintains the tension of the timing chain CH at an appropriate level as well as reduces its vibration.

The known chain tensioner 500 used in such a chain guide mechanism includes, for example, as shown schematically in FIG. 5, a tensioner body 510 having a cylindrical plunger bore 511 with one open end, a cylindrical plunger 520 inserted in the plunger bore 511 to freely slide against a cylindrical surface 513 of the plunger bore 511, and means for biasing the plunger 520 in a projecting direction from the plunger bore 511.

The biasing means is formed by a coil spring 540 accommodated inside a cylindrical recess 521 in the cylindrical plunger 520 and compressed between the plunger and a bottom part 512 of the plunger bore 511.

Oil is supplied from an oil supply hole 514 formed in the plunger bore 511, so that an oil pressure chamber 501 formed between the plunger bore 511 and the plunger 520 is filled with the oil, which oil urges the plunger 520 in a projecting direction. A check valve 550 (schematically shown as a check ball) stops the oil from flowing out from the oil supply hole 514.

As the plunger 520 thereby reciprocates, the oil flows through a small gap between the plunger 520 and the plunger bore 511, and the flow resistance provides the damping effect of slowing down the reciprocal movement of the plunger 520.

In such a chain tensioner, in the event of tension in the timing chain or engine oil pressure building up excessively during use, there were worries that the pressure of the oil pressure chamber could become too high, because of which noise or vibration problem could arise, or the timing chain could be damaged.

To prevent such a situation, chain tensioners provided with a relief valve for releasing the pressure of the oil pressure chamber when it reaches or exceeds a predetermined limit have been known (see Japanese Patent Application Laid-open Nos. 2002-327810, 2011-226534, 2002-130401, 2002-235818, and 2006-125430, etc).

SUMMARY OF THE INVENTION

In the known chain tensioners including those of Japanese Patent Application Laid-open Nos. 2002-327810, 2011-226534, 2002-130401, 2002-235818, and 2006-125430, etc, there was a problem that it was very hard to set a correct valve opening pressure of the relief valve in relation to the engine oil pressure, so that a desired reaction force and damping characteristics corresponding to the rpm could not easily be achieved.

Too high a valve opening pressure would lead to noise and inappropriate tension and friction due to too much pressure being applied at low engine oil pressure, while too low a valve opening pressure would lead to inappropriate chain tension, incorrect tensioner behaviors, etc, due to looseness of the chain at high engine oil pressure.

The chain tensioners known from Japanese Patent Application Laid-open Nos. 2002-327810, 2011-226534 and the like each has its relief valve provided to the tensioner body via an additional oil passage, not disposed inside the plunger bore. Therefore, the chain tensioner itself is increased in size, and so are the number of parts to be machined and the number of assembling steps.

The chain tensioners known from Japanese Patent Application Laid-open Nos. 2002-130401, 2002-235818, 2006-125430 and the like each has its relief valve disposed inside the plunger bore and so a size increase is avoided. On the other hand, the internal structure of the plunger is more complex and therefore the number of assembling steps is increased.

Another problem is that, since the oil released by the relief valve flows out of the system, more oil is consumed, and accordingly the oil pump performance needs to be enhanced.

Moreover, in known chain tensioners including those of Japanese Patent Application Laid-open Nos. 2002-327810, 2011-226534, 2002-130401, 2002-235818, and 2006-125430, etc, the valve is configured such that the check ball moves inside a check valve. Therefore, in an operating condition wherein the pressure of the oil pressure chamber rises suddenly, the check ball sits on the check valve seat with a large impact immediately before the relief valve releases the pressure, because of which there was a possibility that the check valve function could be deteriorated due to damage to the check ball or check valve seat.

It is an object of the present invention to solve these problems and to provide a chain tensioner that can maintain the pressure of the oil pressure chamber at a correct level for a wide range of engine oil pressure levels to achieve a desired reaction force and damping characteristics corresponding to the rpm, and enable a reduction in the number of parts to be machined and the number of assembling steps, reduce the amount of oil flowing out of the system, and prevent damage to the check valve, without causing an increase in size of the chain tensioner.

The chain tensioner of the present invention includes: a tensioner body having a cylindrical plunger bore with one open end; a cylindrical plunger slidably inserted in the plunger bore; and biasing means accommodated inside an oil pressure chamber formed between the plunger bore and the plunger such as to freely expand and contract and to urge the plunger in a projecting direction; a check valve unit that stops reverse flow of oil flowing into the oil pressure chamber; and the chain tensioner also includes a first relief valve unit and a second relief valve unit that release oil when pressure of the oil pressure chamber reaches or exceeds a predetermined high level. The second relief valve unit has a higher valve opening pressure than that of the first relief valve unit. The problems described above are thereby solved.

The chain tensioner according to claim 1 includes a first relief valve unit and a second relief valve unit that release oil when pressure of the oil pressure chamber reaches or exceeds a predetermined high level, and the second relief valve unit has a higher valve opening pressure than that of the first relief valve unit. This makes it possible to design the first relief valve unit to open at a relatively low oil pressure, and to design the second relief valve unit to open when the pressure of the oil pressure chamber rises even more due to a further increase in engine oil pressure after the first relief valve unit has opened.

Therefore, through the opening of the first relief valve unit, noise and inappropriate tension and friction caused by too much pressure being applied at low engine oil pressure can be prevented, while inappropriate chain tension and incorrect tensioner behaviors due to looseness of the chain at high engine oil pressure can be prevented. Moreover, the chain tension during high speed rotation of the engine can be lowered by means of the second relief valve unit that opens at an even higher pressure. Thus the level of pressure of the oil pressure chamber can be maintained correctly in relation to the engine oil pressure, and a desired reaction force and damping characteristics corresponding to the rpm can be achieved.

According to the configuration set forth in claim 2, the check valve unit is disposed as a valve element of the first relief valve unit, and the first relief valve unit and the check valve unit are formed integral with each other. Therefore, even though the tensioner has three valve units assembled therein, it has about the same size as a tensioner with two valve units, and thus an increase in size or the number of parts to be machined can be avoided.

Since the check valve unit is disposed as a valve element of the first relief valve unit, and the first relief valve unit and the check valve unit are formed integral with each other, they can be assembled in one piece into the tensioner after assembling the first relief valve unit in advance. Thus, the number of assembling steps can be reduced.

Also, the tensioner is configured such that the pressure is released by the first relief valve unit toward the side from which the oil is supplied, so that the amount of oil flowing out of the system can be reduced, and, since the pressure difference between the oil pressure chamber and the pressure relief side is smaller, the speed at which the first relief valve unit returns to its closed state can be increased.

Moreover, even when the first relief valve unit is activated before the oil supply is started, such as when starting the engine, the oil is circulated rather than flowing out of the system because of the structure in which the pressure is released toward the side from which the oil is supplied, and therefore, rattling of the chain at the start of the engine can be reduced.

According to the configuration set forth in claim 3, the plunger includes an oil reservoir chamber inside thereof, which is in fluid communication with an oil supply hole. The first relief valve unit is disposed between the oil reservoir chamber and the oil pressure chamber, with a relief valve seat thereof being oriented toward the oil pressure chamber.

An oil circulation passage is formed between an outer circumference of a relief sleeve and an inner surface of the plunger for allowing released oil to circulate back to the oil reservoir chamber. When applied to chain tensioners of the type that has an oil reservoir chamber inside the plunger, the number of parts to be machined and the number of assembling steps are reduced, the amount of oil flowing out of the system is reduced, and damage to the check valve can be prevented, without having to increase the size of the chain tensioner.

Moreover, the oil can circulate back to the oil reservoir chamber when the check valve releases the oil, so that oil loss from the oil reservoir chamber can be reduced.

According to the configuration set forth in claim 4, the oil circulation passage includes an orifice that restricts the amount of oil. When the pressure of the oil pressure chamber has exceeded the valve opening pressure of the first relief valve unit but has not exceeded the valve opening pressure of the second relief valve unit, the pressure of the oil pressure chamber and the damping characteristics are maintained within a predetermined range because of the orifice. When the amount of oil has increased to surpass the effect of the orifice and to cause a further increase of pressure of the oil pressure chamber, the second relief valve unit opens, so that the chain tension during high speed rotation can be further lowered. Thus a correct level of pressure of the oil pressure chamber can be maintained for a wider range of engine oil pressure levels, and a desired reaction force corresponding to the rpm can be achieved.

According to the configuration set forth in claim 5, a bottom circulation passage is formed in the bottom part of the plunger bore. When the second relief valve unit opens at a high pressure of a predetermined level or more, the released oil will circulate back to the side where the oil was supplied from, so that the amount of oil flowing out of the system can be reduced.

DESCRIPTION OF THE PREFERRED EMBODIMENT

Embodiment 1

A chain tensioner 100 and a relief valve unit 160 according to one embodiment of the present invention will be described with reference to the drawings.

Figure 1:
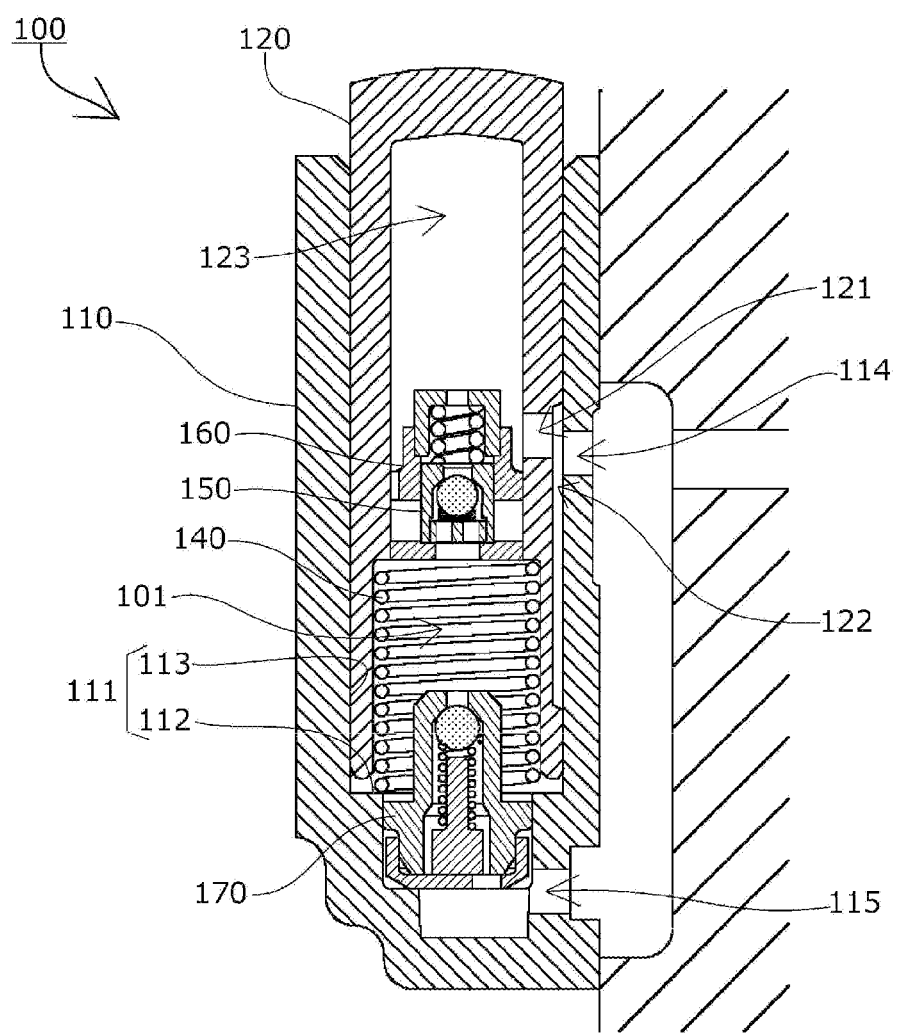
FIG. 1 is a cross-sectional view of a chain tensioner according to one embodiment of the present invention.

The chain tensioner 100 includes, as shown in FIG. 1, a plunger 120 that has an oil reservoir chamber 123 inside that is in fluid communication with an oil supply hole 114 via a supply passage 122 and a plunger supply hole 121. The first relief valve unit 160 is disposed between the oil reservoir chamber 123 and an oil pressure chamber 101, and an oil circulation passage 166 is formed between an outer circumference of a relief sleeve 161 of the first relief valve unit 160 and an inner surface of the plunger 120 for allowing released oil to circulate back to the oil reservoir chamber 123.

A coil spring 140, which is means for urging the plunger 120 in a projecting direction, is received on one end thereof by a bottom part 112 of the plunger bore 111 of the tensioner body 110 to apply a pressing force. The oil pressure chamber 101 is formed on this bottom part 112 side.

A second relief valve unit 170 is disposed at the bottom part 112 of the plunger bore 111 of the tensioner body 110, and a bottom circulation passage 115 is provided for allowing the oil that is released when the second relief valve unit 170 opens to circulate back to the side where the oil is supplied from.

Figure 2:
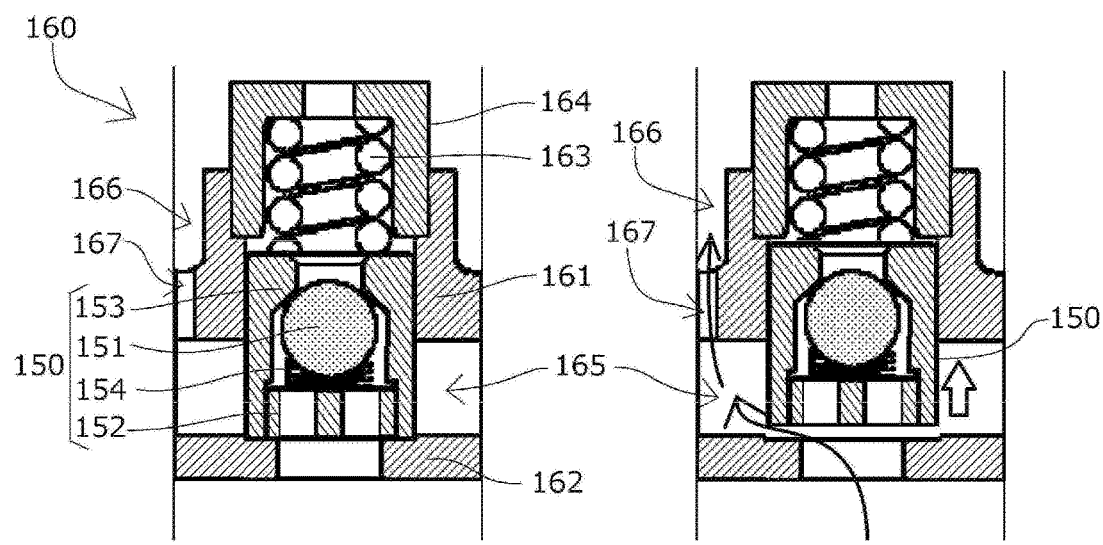
FIG. 2A and FIG. 2B are enlarged cross-sectional views of a first relief valve unit of FIG. 1.

The first relief valve unit 160 includes, as shown in FIG. 2A, the relief sleeve 161 that slidably holds a check valve unit 150 inside, a relief valve seat 162 that opens and closes as the check valve unit 150 slides, a unit pressing spring 163 that is a unit pressing mechanism for pressing the check valve unit 150 toward the relief valve seat 162, and a unit pressing spring holder 164 that supports and secures one end of the unit pressing spring 163.

The relief sleeve 161 includes, on the rear side of the relief valve seat 162, a relief hole 165 that is a relief part for letting out the oil that is released when the pressure reaches or exceeds a predetermined high level to the outer circumferential side. An oil circulation passage 166 is formed on one side of the relief hole 165 facing the oil reservoir chamber 123 via an orifice 167.

The check valve unit 150 includes a check ball 151, a check valve seat 153 that opens and closes as the check ball 151 sits thereon and separates therefrom, a retainer 152 holding the check ball 151 inside the check valve seat 153, and a ball pressing spring 154 that lightly presses the check ball 151 toward the check valve seat 153.

The check valve seat 153 has a cylindrical outer shape and is configured to sit on the relief valve seat 162 of the relief valve unit 160.

The second relief valve unit 170 may be of any type. In this embodiment, a ball type relief valve is used.

The valve opening pressure of the second relief valve unit 170 is set higher than the valve opening pressure of the first relief valve unit 160.

How the chain tensioner 100 according to one embodiment of the present invention configured as described above operates will be explained.

Oil is supplied from the oil supply hole 114 to the oil reservoir chamber 123 via the supply passage 122 and plunger supply hole 121.

When the plunger 120 moves in a projecting direction, the oil inside the oil reservoir chamber 123 presses the check ball 151 down from the check valve seat 153 and flows into the oil pressure chamber 101.

When the plunger 120 is pushed in to retract, the pressure of the oil pressure chamber 101 rises, whereby the check ball 151 is pressed against the check valve seat 153, and the oil is stopped from flowing out of the check valve unit 150. The pressure then acts to press the check valve unit 150 itself upward against the pressing force of the unit pressing spring 163.

When the pressure of the oil pressure chamber 101 reaches or exceeds the predetermined high valve opening pressure of the first relief valve unit 160, the unit pressing spring 163 is compressed and the entire check valve unit 150 retracts as shown in FIG. 2B and separates from the relief valve seat 162 of the first relief valve unit 160, so that the pressure of the oil pressure chamber 101 is released.

In this embodiment, as shown in the drawing, the relief valve seat 162 is formed in a concave shape, and closed by the check valve unit 150 that fits therein to a predetermined depth. With this structure, the pressure of the oil pressure chamber 101 is released after the check valve unit 150 has retracted until it is disengaged, which means that pressure leakage when the valve is closed is minimized.

As the check valve unit 150 separates from the relief valve seat 162 to release the pressure of the oil pressure chamber 101, the oil flows out of the oil pressure chamber 101 through the relief hole 165 and orifice 167 into the oil circulation passage 166 on the outer circumferential surface of the relief sleeve 161, and thus the oil circulates back to the oil reservoir chamber 123 without flowing out of the system.

When the pressure of the oil pressure chamber 101 reduces to or below a predetermined level, the check valve unit 150 is moved by the unit pressing spring 163 and again sits on the relief valve seat 162, to keep the closed state and to maintain the pressure therein.

Since the pressure is released by the first relief valve unit 160 toward the oil reservoir chamber 123 from which the oil is supplied in this structure, the pressure difference between the oil pressure chamber 101 and the oil reservoir chamber 123 is smaller as compared to conventional structures wherein the pressure is released out of the system with a relief valve, and therefore the speed at which the relief valve unit 160 returns to its closed state is increased.

Even when the first relief valve unit 160 opens to release pressure, the amount of oil that flows out is limited by the orifice 167, so that a sudden pressure drop of the oil pressure chamber, and a pressure buildup due to a further increase in engine oil pressure, are prevented, and predetermined damping characteristics are preserved.

When the pressure of the oil pressure chamber 101 suddenly rises to a high level, the contact pressure between the check ball 151 and the check valve seat 153 will increase rapidly.

If the pressure suddenly rises to or exceeds a predetermined high level in a state where the check ball 151 is not in contact with the check valve seat 153, the check ball 151 will collide against the check valve seat 153.

Since the check valve seat 153 retracts at this time, the impact caused by a sudden increase in the contact pressure or collision between the check ball 151 and the check valve seat 153 can be mitigated, so that deterioration of the check valve function due to damage to the check ball or check valve seat can be prevented.

Also, since the first relief valve unit 160 is integral with the check valve unit 150 as shown in FIG. 2A, and can be prepared in advance as a single component, the number of parts of the tensioner body 110 or the plunger 120 that need to be machined, and the number of process steps of assembling the chain tensioner 100 can be greatly reduced.

When the pressure of the oil pressure chamber 101 remains at a high level of not less than the valve opening pressure of the first relief valve unit 160, and further rises and reaches or exceeds the valve opening pressure of the second relief valve unit 170 due to a further increase in engine oil pressure, the second relief valve unit 170 opens, so as to allow the oil released from the bottom circulation passage 115 in the bottom part 112 of the plunger bore 111 to circulate back to the oil supply side.

When the pressure of the oil pressure chamber 101 reduces to or below the valve opening pressure of the second relief valve unit 170, the second relief valve unit 170 closes, so as to keep the closed state and to maintain the pressure therein.

Since the pressure is released by the second relief valve unit 170 toward the side from which the oil is supplied in this structure, the pressure difference between the oil pressure chamber 101 and the oil supply side is smaller as compared to conventional structures wherein the pressure is released out of the system with a relief valve, and therefore the speed at which the relief valve unit 170 returns to its closed state is increased.

Figure 3:
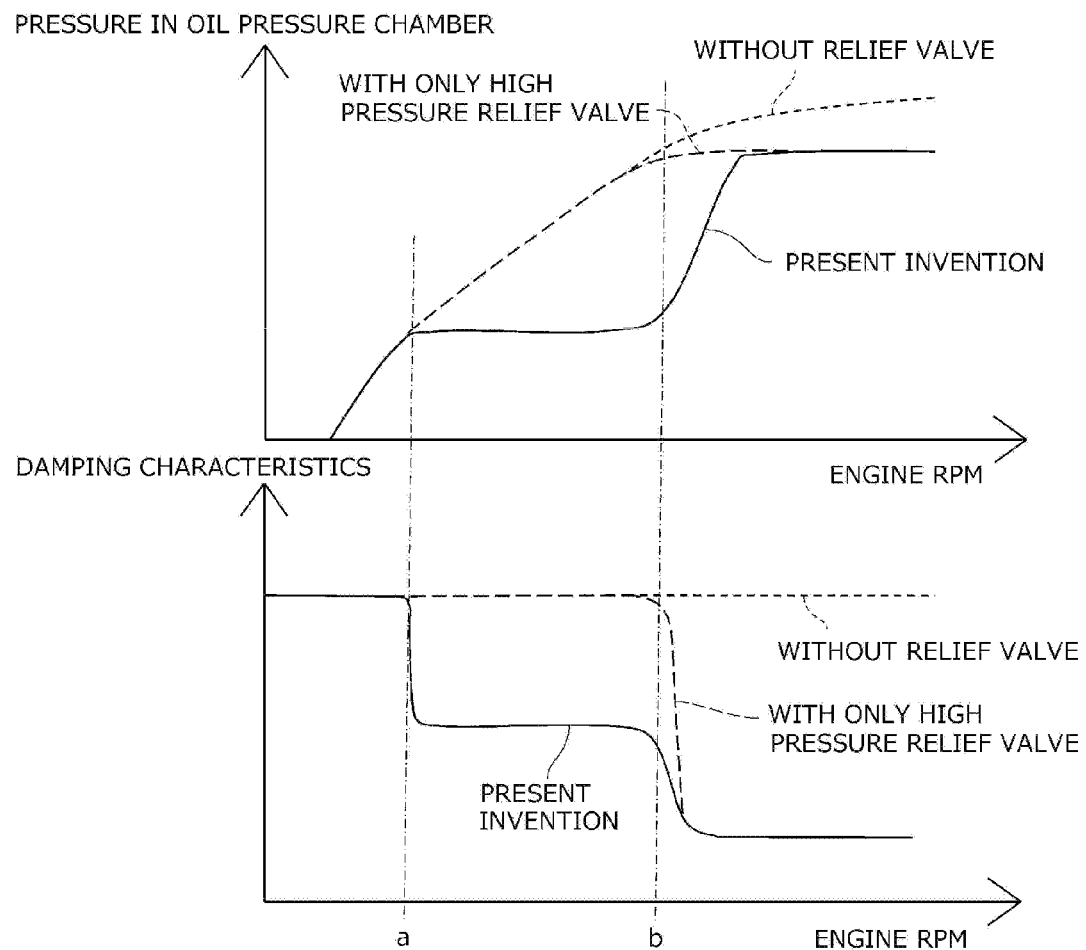
FIG. 3 is a diagram for explaining the characteristics of the chain tensioner according to one embodiment of the present invention.
Figure 4:
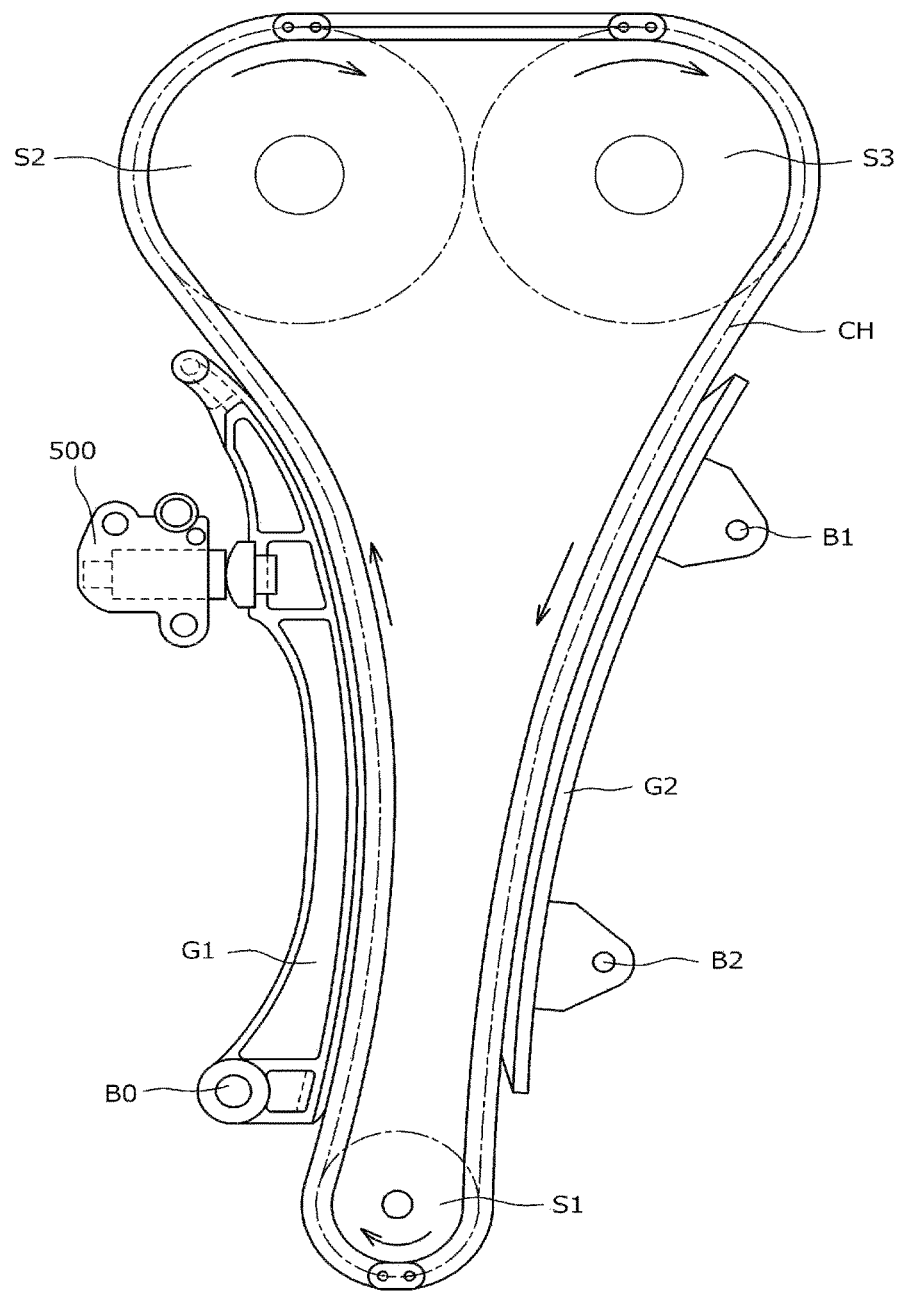
FIG. 4 is an illustrative diagram of the chain tensioner used in a chain guide mechanism of an engine.
Figure 5:
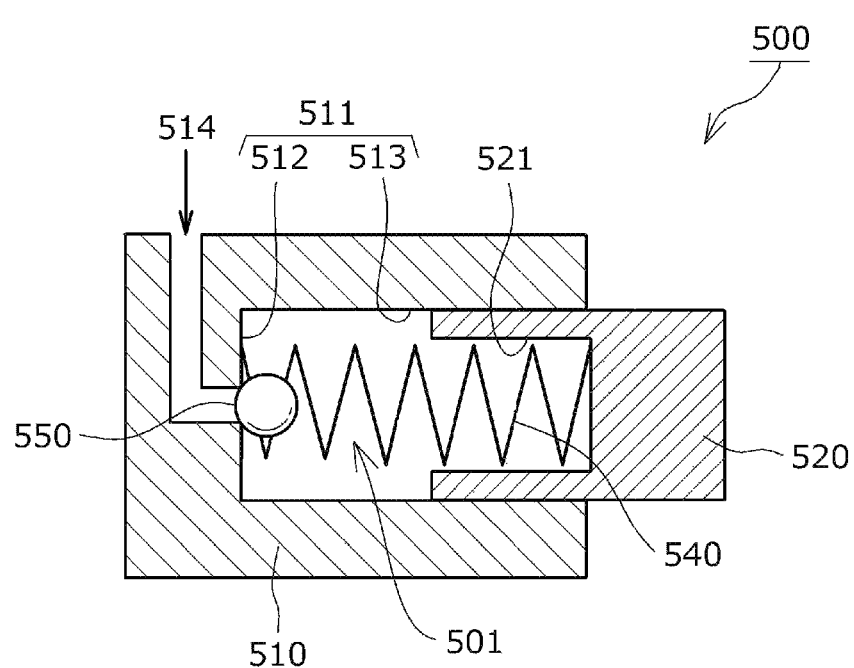
FIG. 5 is a schematic illustrative diagram of a conventional chain tensioner.

FIG. 3 shows the relationship between the engine rpm, pressure in the oil pressure chamber 101, and changes in the damping characteristics.

As the engine rpm increases, the pressure of oil being supplied rises, and so does the pressure in the oil pressure chamber 101.

At the time when the engine rpm rises to point a in FIG. 3, the pressure in the oil pressure chamber 101 reaches the valve opening pressure of the first relief valve unit 160, so that the first relief valve unit 160 opens.

The oil that flows out will travel via the orifice 167 and oil circulation passage 166 back to the oil reservoir chamber 123 that is where the oil was supplied from. At this time, the pressure in the oil pressure chamber 101 does not drop and remains unchanged due to the hydraulic pressure applied to the oil reservoir chamber 123 from the oil supply side.

Also, the damping characteristics do not drop more than a predetermined level because of a damping effect provided by the flow resistance of the orifice 167.

During a period between points a and b of the engine rpm in FIG. 3, the first relief valve unit 160 is open while the second relief valve unit 170 is closed, and the pressure in the oil pressure chamber 101 and the damping characteristics are maintained substantially at a predetermined level because of the orifice 167.

As the engine rpm approaches point b in FIG. 3, the pressure of the oil supplied from the engine is further increased so that the stabilizing effect by the orifice 167 is no longer achieved, as a result of which the pressure in the oil pressure chamber 101 rises.

At the time when the engine rpm rises to point b in FIG. 3, the pressure in the oil pressure chamber 101 reaches the valve opening pressure of the second relief valve unit 170, so that the second relief valve unit 170 opens.

The oil that flows out will travel via the oil circulation passage 115 back to the oil supply side, but the pressure in the oil pressure chamber 101 does not drop and remains unchanged due to the hydraulic pressure applied from the supply side.

The damping characteristics are significantly lowered, since there is then only the damping effect provided by the flow resistance of the second relief valve unit 170.

When there are no relief valves, as indicated with a small dot line in FIG. 3, the pressure of the oil pressure chamber keeps rising with the increase in the engine rpm, while the damping characteristics remain constant at the initial high level.

In this case, it is not possible to achieve a specific pressure or damping characteristics appropriate for a particular rpm.

If there is only one relief valve unit that has the same valve opening pressure as that of the second relief valve unit 170, as indicated with a large dot line in FIG. 3, the pressure of the oil pressure chamber keeps rising with the increase in the engine rpm until the engine rpm reaches point b in FIG. 3, while the damping characteristics remain constant at the initial high level. When the engine rpm reaches point b in FIG. 3, the pressure in the oil pressure chamber stops rising, and the damping characteristics drop largely.

With one relief valve only, the rpm corresponding to the level at point b in FIG. 3 could be changed by adjusting the valve opening pressure, and therefore it would be possible to set an upper limit of the pressure of the oil pressure chamber in accordance with the rpm. Nevertheless, various levels of pressure and damping characteristics appropriate for a wide range of engine oil pressure levels cannot be achieved.

In contrast, according to the chain tensioner of the present invention, the pressure change points of the oil pressure chamber corresponding to the rpm can be adjusted by appropriately setting valve opening pressures of the first relief valve unit 160 and the second relief valve unit 170, and the damping characteristics when the first relief valve unit 160 opens can be adjusted by appropriately designing the orifice 167, so that the pressure of the oil pressure chamber can be maintained correctly corresponding to a wide range of engine oil pressure levels, and a desired reaction force and damping characteristics corresponding to the rpm can be achieved.

While a specific example of the chain tensioner according to the present invention has been described in the embodiment above, the chain tensioner according to the present invention is not limited to this example, and the shapes, positions, sizes, and positional relationships with each other of various constituent parts may be changed in various manners.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also used for similar transmission mechanisms that use belts, ropes and the like, and can be applied in a variety of industrial fields.

What is claimed is:

1. A chain tensioner comprising: a tensioner body having a cylindrical plunger bore with one open end; a cylindrical plunger slidably inserted in the plunger bore; and biasing means accommodated inside an oil pressure chamber formed between the plunger bore and the plunger such as to freely expand and contract and to urge the plunger in a projecting direction, the chain tensioner also comprising
a check valve unit that stops reverse flow of oil flowing into the oil pressure chamber, and a first relief valve unit and a second relief valve unit that release oil when pressure of the oil pressure chamber reaches or exceeds a predetermined high level,
the second relief valve unit having a valve opening pressure that is higher than a valve opening pressure of the first relief valve unit.

2. The chain tensioner according to claim 1, wherein the check valve unit is disposed as a valve element of the first relief valve unit, and
the first relief valve unit and the check valve unit are formed integral with each other.

3. The chain tensioner according to claim 2, wherein the plunger includes an oil reservoir chamber inside thereof, which is in fluid communication with an oil supply hole,
the first relief valve unit being disposed between the oil reservoir chamber and the oil pressure chamber with a relief valve seat thereof being oriented toward the oil pressure chamber, and wherein an oil circulation passage is formed between an outer circumference of the first relief valve unit and an inner surface of the plunger for allowing released oil to circulate back to the oil reservoir chamber, and the second relief valve unit is disposed in a bottom part of the plunger bore.

4. The chain tensioner according to claim 3, wherein the oil circulation passage includes an orifice that restricts an amount of oil.

5. The chain tensioner according to claim 3, wherein a bottom circulation passage is formed in the bottom part of the plunger bore for allowing the oil that is released when the second relief valve unit opens to circulate back to a side where the oil was supplied from.

* * * * *